June 17, 1930.　　　I. D. RICHHEIMER　　　1,763,863
COFFEE MAKING APPARATUS
Filed July 20, 1929
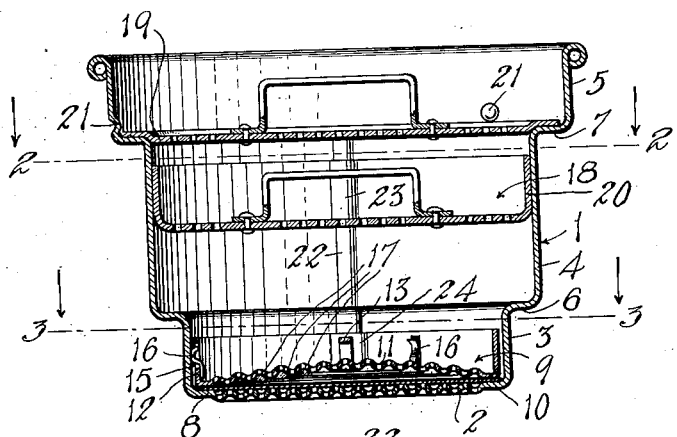
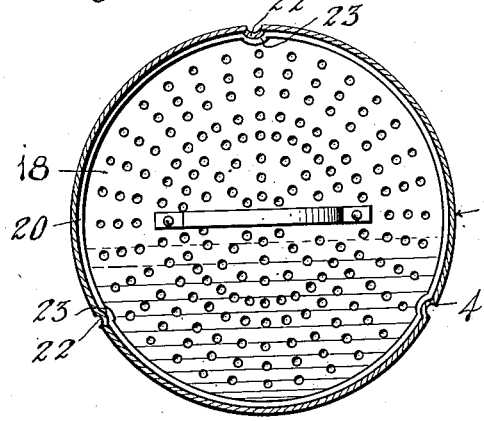
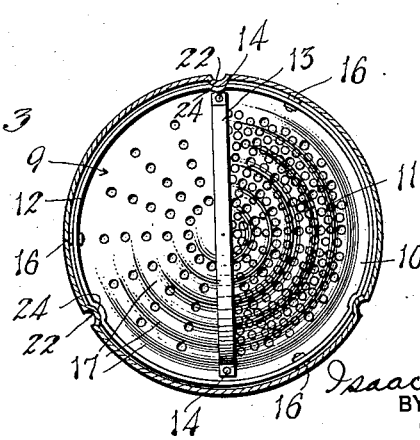
INVENTOR
Isaac D. Richheimer,
BY
ATTORNEYS Patented June 17, 1930

1,763,863

UNITED STATES PATENT OFFICE

ISAAC D. RICHHEIMER, OF NEW YORK, N. Y.

COFFEE-MAKING APPARATUS

Application filed July 20, 1929. Serial No. 379,653.

This receptacle generally comprises a casing having an open top and a perforated bottom over the inner side of which is clamped a sheet of filter medium by a binder plate. The ground coffee is placed in the casing upon the binder plate and a perforated plate is placed upon the top of the ground coffee to spread boiling water over the coffee as it is admitted through the open top of the casing. This plate may also constitute a coffee weight to exert pressure by gravity upon the coffee as the latter tends to rise and swell under the influence of the water so as to maintain the coffee in a more or less compact but not too tightly packed mass, or a separate coffee weight in addition to the spreader plate may be utilized.

One object of the invention is to provide in coffee-making apparatus of the character described a novel and improved binder plate for clamping the filter medium upon the bottom of said receptacle whereby the binder plate can be applied to and removed from the receptacle without rotation, so that injury to the filter medium by rotation of the binder plate in contact with the filter medium is avoided.

Another object is to provide a receptacle for coffee-making apparatus having a corrugated perforated bottom and a corrugated perforated binder plate, so that the corrugations form channels for the passage of liquid from the perforations in the binder plate to the perforations in the bottom and at the same time the corrugations increase the rigidity or resistance of the binder plate and bottom against flexing or becoming distorted.

Other objects are to provide novel and improved friction lock means for the binder plate; to provide a binder plate having a handle so attached thereto as to avoid strains upon the perforated portions of the plate during application and removal of the plate; and to obtain other advantages and results as will be more fully brought out by the following description.

Referring to the accompanying drawing in which corresponding and like parts are designated by the same reference characters, Figure 1 is a transverse vertical sectional view through a coffee receptacle embodying my invention.

Figure 2 is a horizontal sectional view on the line 2—2 of Figure 1, and

Figure 3 is a similar view on the line 3—3 of Figure 1.

Specifically describing the illustrated embodiment of the invention, the receptacle comprises a casing 1 which has a perforated bottom 2. Extending upwardly from the bottom 2, the side walls of the casing include a substantially cylindrical portion 3 at the upper end of which is a portion 4 of larger diameter. At the upper end of the portion 4 is another portion 5 of still larger diameter. Substantially horizontal shoulders 6 and 7 are thus formed between the respective portions 3 and 4 and the portions 4 and 5. A sheet of filter medium 8, such as filter paper, is arranged upon the inside of the bottom 2, and is held in proper position by a binder plate 9 which comprises a body portion having an imperforate rim 10 and a central perforated portion 11. The plate is formed with a peripheral flange 12 which extends at substantially right angles to the plane of the body portion and is of a diameter to loosely fit within the cylindrical portion 3 of the side walls of the casing. A handle 13 extends diametrically of the binder plate and has its ends fastened at 14 to the imperforate rim 10. The flange 12 may be provided with a plurality of transverse openings 15 in each of which may be arranged a spring arm 16 having one end secured to the inner side of the flange and the other end projecting through the corresponding opening so as to frictionally engage the inner surfaces of the portion 3 of the side wall of the casing and frictionally hold the binder plate in operative position upon the filter sheet 8. With this construction it is possible to apply the binder plate to the casing by simple axial movement into tight contact with the filter sheet, and thereby rotative movement of the binder plate which might tend to tear the filter sheet, is avoided. Furthermore, the spring arms 16 being arranged in the openings 15 are protected from injury and also prevented from catching upon other objects.

Preferably, the central portion 11 of the binder plate is slightly crowned so that only the imperforate rim 10 of the plate contacts with the filter sheet. This crown is somewhat exaggerated in Figure 1 of the drawing for the purpose of illustration and need be only slightly curved. Also, preferably the binder plate is formed with a plurality of annular concentric corrugations 17 which form channels for the passage of liquid from the perforations in the binder plate to the perforations in the bottom 2. In many cases it may be desirable to similarly corrugate the bottom 2; and preferably the corresponding corrugations of the binder plate and the bottom 2 are reversely arranged so that alternate corrugations form channels between said plate and said bottom for passage of liquid. In addition to forming passages for the liquid, these corrugations strengthen the binder plate and the bottom and reenforce them against distortion.

In use of the receptacle the filter sheet is placed upon the bottom 2 after which it is clamped into position by the binder plate 9. The ground coffee is then placed upon the binder plate after which a coffee weight or spreader plate is placed upon the coffee. In the drawings I have shown both a coffee weight 18 and a spreader plate 19, although the coffee weight might also serve as a spreader plate so that the spreader plate 19 could be dispensed with. The coffee weight comprises a perforated plate having a peripheral flange 20 arranged at substantially right angles to the plane of the plate and of a diameter to slidably fit within the portion 4 of the side walls of the casing. The flange is preferably of such length as to prevent tilting of the coffee weight within the casing, so that the flange serves to accurately guide the coffee weight as the coffee swells when water is admitted to it. The coffee weight rests by gravity upon the coffee so that it exerts a constant pressure by action of gravity so as to maintain the ground coffee in a more or less compact, but not too tightly packed mass. It is desirable that the coffee be somewhat loose so that the water may easily percolate therethrough.

The spreader plate 19 comprises a perforated plate which may be locked in position by projections 21 on the inner side of the portion 5 of the casing overlying the edge of the plate. This edge has notches corresponding in number and position to the projections 21 to pass over the projections as the plate is applied to the casing. This is fully disclosed in my Patent No. 1,613,483.

It will be obvious to those skilled in the art that the friction lock means described in connection with the binder plate may also be utilized on the coffee weight or the spreader plate, and similarly the guiding action of the elongated flange described in connection with the coffee weight may also be applied to the binder plate so that application and removal of the binder plate to and from the casing is facilitated.

It will be understood from the foregoing that in operation of the receptacle, boiling water is admitted to the receptacle through the spreader plate 19 and coffee weight 18. This water percolates downwardly through the coffee and perforations in the binder plate. The liquid then passes through the filter sheet and the perforations in the bottom 2. The corrugations in the binder plate and the bottom of the casing insure a free and unobstructed passage of the liquid from the binding plate to the perforations in the bottom. Were the binder plate and the bottom 2 made flat it would be possible for many of the openings of the two plates to get out of register and thereby closed so as to prevent free flow of liquid. It is practically impossible to cause the openings in the binder plate 9 and the bottom 2 to register.

For guiding the coffee weight and binder plate in their movements into and out of the casing, I may provide a plurality of parallel longitudinal ribs 22 on the inner walls of the casing which are slidably received by grooves 23 and 24, respectively on the coffee weight and binder plate. These ribs also prevent rotation of the coffee weight and spreader plate.

It should be understood that the construction herein described is primarily for the purpose of illustrating the principles of the invention; that the invention may be applied to other types of apparatus for producing an infusion from other materials than coffee, and that many modifications and changes may be made in the details of construction of the apparatus without departing from the spirit or scope of the invention.

Having thus described my invention, what I claim is:

1. Coffee-making apparatus including a casing having a perforated bottom, a filter medium upon said bottom, and a perforated binder plate upon said filter medium to hold it upon said bottom, said bottom and said binder plate being corrugated and the corrugations of one being arranged reversely to the corresponding corrugations of the other so that alternate corrugations form channels between said bottom and said binder plate to conduct liquid from the perforations of the binder plate to the perforations of said bottom and the corrugations reenforce said bottom and said plate.

2. Coffee-making apparatus including a casing having a perforated bottom, a perforated plate within said casing, said plate having a peripheral flange at right angles to the plane of the plate and of a diameter to slide into said casing, said flange having transverse openings, and spring arms each having one end fixed upon the inner side of said flange and the other end projecting through one of said openings to frictionally engage the walls of said casing and hold said plate in operative position.

ISAAC D. RICHHEIMER.